Oct. 30, 1962 F. DER YUEN ET AL 3,060,471
AERO-GANGPLANK

Filed July 27, 1960 3 Sheets-Sheet 1

INVENTORS
FRANK DER YUEN
FRANCIS B. JOHNSON

By *George A. Sullivan*
Agent

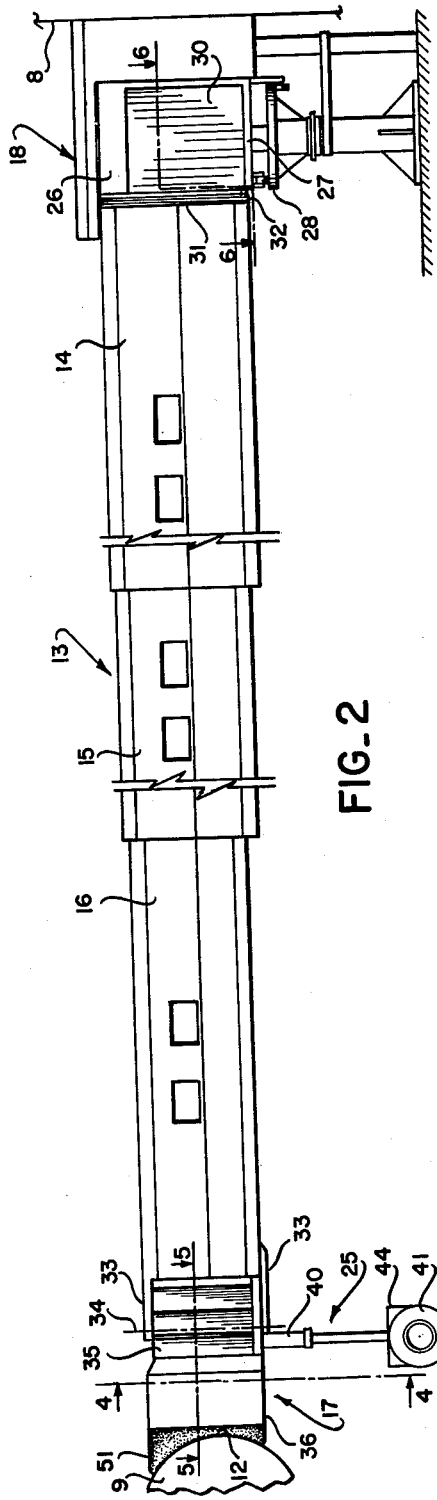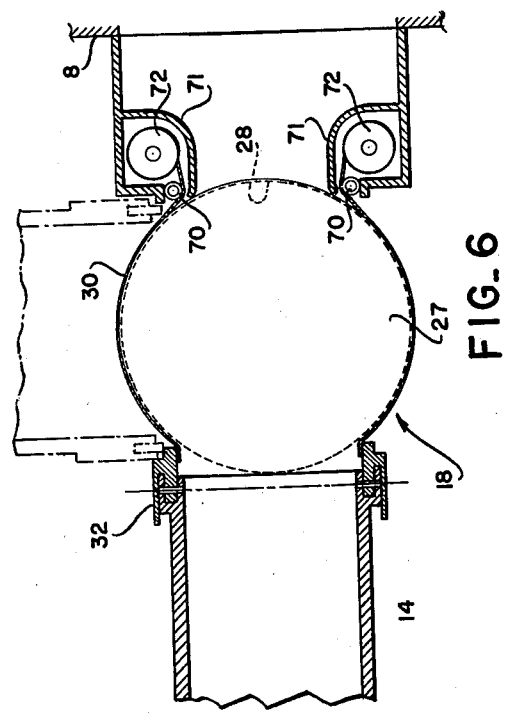

INVENTORS
FRANK DER YUEN
FRANCIS B. JOHNSON
By George C. Sullivan
Agent

United States Patent Office 3,060,471
Patented Oct. 30, 1962

3,060,471
AERO-GANGPLANK
Frank Der Yuen, Inglewood, and Francis B. Johnson, Los Altos, Calif., assignors to Lockheed Aircraft Corporation, Burbank, Calif.
Filed July 27, 1960, Ser. No. 45,752
2 Claims. (Cl. 14—71)

This invention relates to apparatus for loading and unloading vehicles at terminals, and it relates more particularly to a novel enclosed mobile passageway comprising a plurality of ramps for passengers or cargo and service facilities which permits the expeditious and accurate alignment of the outer end of the ramp with the vehicle door and the prompt handling of passengers or cargo and services between the vehicle and the terminal building.

A suitable ramp for the loading and unloading of passengers, cargo and services has been needed in the transportation field for connecting between second level loading platforms at transportation terminals or depots and the transporting vehicle. The device of the present invention meets the requirements for a workable means for allowing passengers to embark and disembark without the inconvenience of crossing a flight ramp teaming with the servicing activity associated with the vehicle. It ensures protection from rain, ice, sleet, snow, or the sun, as well as from jet blasts and noise, grease slicks, and ramp accidents and further, the device of the present invention allows passengers to move leisurely with a feeling of complete security at a natural level amid pleasant surroundings.

In general, the device of the present invention fulfills many passenger and cargo loading requirements. For example, the invention employs a three-section ramp arrangement which conveniently telescopes so that the total ramp can be extended sufficiently to reach any point within the usual vehicle parking area. A vestibule arranged at the end of the ramp units adjacent to the vehicle, such as an aircraft, is rotatably arranged so that a full 90° of rotation may be employed to accommodate the vehicle parking angle. Vertical adjustment of the aircraft vestibule is accomplished by means of a hydraulic lift incorporated in a mobile support for the vestibule at the outboard end of the ramp arrangement. The airplane entry vestibule serves also to contain the mobile and operational equipment. The many requirements of this device are fulfilled by three functional systems. Rotation of the ramp into position and span adjustment are accomplished by powering the support wheels. Lifting for the vertical positioning of the ramp is a function of the hydraulic struts supporting the aircraft vestibule. Steering and angular positioning of the vestibule face relative to the aircraft door are combined in one simple arrangement and braking of the wheels in automotive fashion completes the functional provisions for a versatile, yet safe and simple, mobile system.

Therefore, it is an important object of the present invention to provide a mobile ramp which permits quick removal of the ramp when it is not in use in a location where it will not interfere with docking or departure of the vehicle, under its own power in or from its designated, grounded location.

Another important object of the present invention is providing mobile ramp which, when in its out of service position is disposed from the building so as to interfere as little as possible with the essential ground vehicle storage and traffic in the area adjacent to the airport buildings.

Another important object of the invention is to provide a novel completely enclosed and weather-proof mobile ramp to permit passengers and personnel or cargo to pass to or from the aircraft or vehicle and the terminal building without the necessity of climbing steps or steep inclines or going into the open.

Still a further object of the present invention is to provide a power-driven ramp structure having a suitably located operating control panel to permit one man interlocked operation of all the functions of the several sections and operations of the ramp.

Still a further object of the present invention is to provide a power-driven ramp structure pivotally mounted on one end of a pedestal adjacent the terminal and having the power driving means located on the opposite end of the ramp structure whereby upon actuation of the power means, the ramp unit sections are positioned relative to one another in a telescoping fashion and the outboard end of the ramp sections directed into accurate alignment with the door of a transportation vehicle.

Other objects of the present invention and the various advantages and characteristics of the present mobile ramp structure will be apparent from a consideration of the following detailed description when taken in connection with the accompanying drawings in which like numbers of reference denote corresponding parts throughout the several views; in which, FIGURE 1 is a plan view of the apparatus of the present invention showing an application thereof for connecting a terminal building to a standard type of commercial aircraft and further showing the apparatus, in broken lines, completely retracted for storage when the apparatus is not in usage;

FIGURE 2 is a side elevation of the ramp units employed in the apparatus of FIGURE 1 showing the ramp units supported on an inboard pedestal and an outboard mobile support structure;

FIGURE 6 is a horizontal sectional view of the terminal vestibule for the ramp units shown in FIGURE 2 taken in the direction of arrows 6—6.

Figure 1:
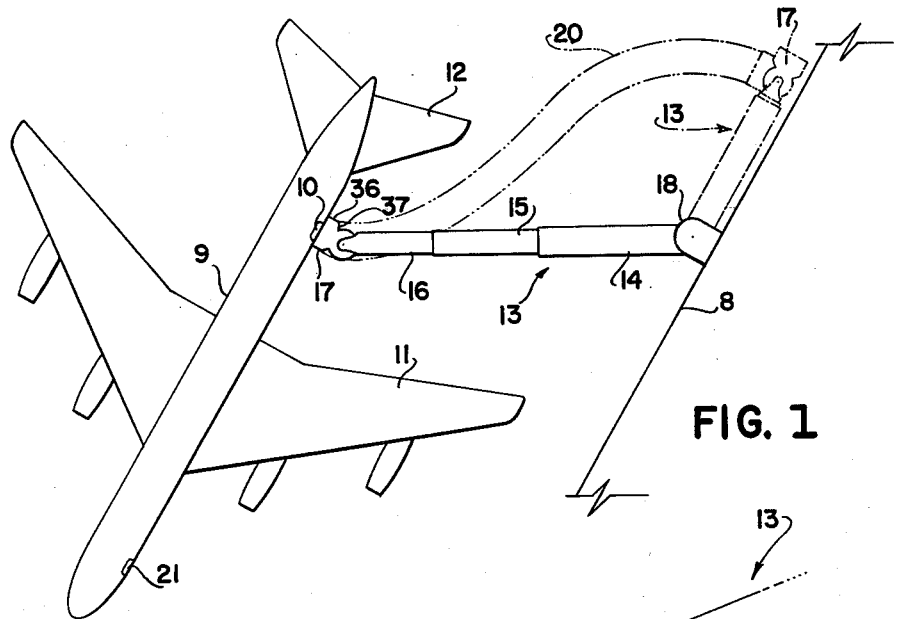

In the drawings, there is illustrated a portion of an elevated two level dock or loading platform 8 and an airplane 9 spaced in front of the dock. The dock 8 forms a part of an airport terminal building and the aircraft 9 is grounded in its delegated position relative to the dock. The dock 8 is elevated from the surface of the ground or field which may be considered to be paved in accordance with the usual practice at airports, etc. The face of the particular dock 8 illustrated is vertical and its upper surface is generally horizontal. The dock 8 may constitute a portion of an air terminal building or of a passenger and freight terminal building or of a passenger and freight terminal structure and is preferably raised several feet above the field level. The particular typical aircraft illustrated has a door or entrance 10 in its fuselage portion, the entrance being at a considerable distance above the ground and disposed between a wing 11 and a tail surface 12.

The apparatus of the present invention, which is intended to facilitate the loading and unloading of the aircraft at the dock 8 may be said to comprise generally a main covered passageway represented by the numeral 13 which spans an area between the parked aircraft and the terminal building and includes an inner section 14, a middle section 15 and an outer section 16. The covered passageway is extendable or made variable in length by means of a telescoping arrangement whereby sections 15 and 16 are arranged for telescoping movement relative to the inner section 14. The passageway is also movable both horizontally and vertically in an arcuate manner about its point of attachment to the dock 9.

The extreme outer end of passageway 13 and pivotally attached to the free end of section 16, there is provided a movable and self-powered aircraft vestibule 17 which mates and engages the aircraft fuselage about the door 12 to provide a complete and continuous passageway from the aircraft to the interior of the airport building. Adjacent the airport building and carrying the inner end of section 14, there is a terminal vestibule 18 which is arranged to permit the covered passageway 13 to pivot both vertically and horizontally.

It is noted from FIGURE 1 that the passageway of the present invention is shown in its retracted position in dotted lines wherein section 14 has telescopingly received sections 15 and 16 respectively. Not only is the passageway retracted to its shortest possible length, but the passageway is shown pivoted to a position adjacent the building face so that the area between the airplane and the airport terminal is not cluttered and is free for uninhibited positioning of aircraft.

Furthermore, because the present invention employs a self-powered vestibule 17 on the outboard end of the passageway, passageway 13 may be extended in length as the passageway moves in a horizontal direction about its pivotal mounting 18 from its completely retracted position as shown in broken lines to its fully extended position shown in solid lines whereby sections 15 and 16 are drawn out of and away from section 14 as the powered aircraft vestibule 17 moves out and away from the face of the bulding. In order to avoid collision between aircraft vestibule 17 and the tail surface 12 of the aircraft, the design of the present invention permits the path of the aircraft vestibule 17 to follow a complex curve indicated by broken lines 20 rather than a true arc. This feature and ability of the present invention is quite desirable since such a design does not require the aircraft to be positioned in any particular location on the airport apron and does not require any complex mechanism or structure on the covered passageway for raising or lowering the ramp above or beneath a tail surface such as 12 in order to avoid collision.

Through the employment of the present invention, it is possible for connecting the terminal with a door in the aircraft when the fuselage of the aircraft is other than parallel to the terminal face. For example, should the fuselage be perpendicular to the terminal face, the passageway would be parallel to the fuselage and the aircraft vestibule 17 turned at a 90° angle to the passageway center line into connection with a nose door 21 provided in the side of the aircraft fuselage. This flexibility of passageway usage is derived primarily from the concept of rotatably mounting the aircraft vestibule on the end of outer section 16 and further supporting the outer end of the passageway as well as the airplane vestibule on a supporting structure 25 as shown in FIGURE 2.

With reference to FIGURE 2, passageway 13 as shown in FIGURE 1 is a mobile device which may be positioned adjacent to the exterior of the terminal building or a finger portal extending from the terminal building at a second floor level. The passageway may be pivoted and extended so as to align wtih an aircraft doorway over a wide range of aircraft positions. When the telescoping sections are extended and the outer aircraft vestibule 17 is positioned, the unit provides a corridor through which passengers can emplane and deplane without exposure to the weather or significant change in level.

With respect to the passageway shown in FIGURE 2, it is seen that the terminal building 10 is provided with a terminal vestibule 18 under which a portion 26 of the vestibule is incorporated. Basically, vestibule portion 26 is rotatably mounted on a turntable 27 which, in turn, is rotatably supported and mounted on rollers riding on an upright pedestal 28. Extending upward from the periphery of the turntable and enclosing the vestibule portion 26, there is provided a flexible curtain on each side of vestibule portion 26 which serves to enclose the sides of the vestibule. The curtains are attached at one end to the inboard section 14 of the passageway. Also, the inboard section of the passageway is connected to the vestibule by means of an accordion curtain arrangement 31 which is disposed to expand at the top of the passageway inboard section as the passageway pivots about a hinge attachment 32 securing the lower end of the inboard section 14 to the turntable 27. By means of the accordion arrangement 31 and side curtains 30, the movable connection between the inboard section of the passageway and the terminal vestibule is completely enclosed and serves to protect passengers or cargo from inclement weather conditions.

Airplane vestibule 17 is pivotally carried on the free end of outboard section 16 of the passageway between a pair of parallel member 33 which are disposed on the bottom and top of the passageway in fixed spaced relationship. Vestibule 17 is rotatably carried between members 33 and is rotatable about a center 34. The mounting portion 35 of the airplane vestibule 17 is substantially circular in horizontal cross-section so that vestibule portion 36 may be rotated about the free end of outboard section 16 without encountering interference between the side walls of the airplane vestibule portion 36 and the side walls of the outboard section 16. A feature resides in the fact that the vestibule portion 36 leads into the mounting portion 35 by tapered walls 37 which are received and nested against the tapered sides of members 33 so that the airplane vestibule 17 may be positioned 90° to either side of the passageway 13 center line. The outboard end of the passageway including the airplane vestibule 17 is supported above the ground level by a mobile support structure 25 which includes a pair of parallel hydraulic piston and cylinder assemblages 40 suitably connected to mounting portion 35 of the vestibule and a pair of wheels 41 provided on the piston end of the piston and cylinder assemblages connectable by means of a common axle 42.

Figure 3:
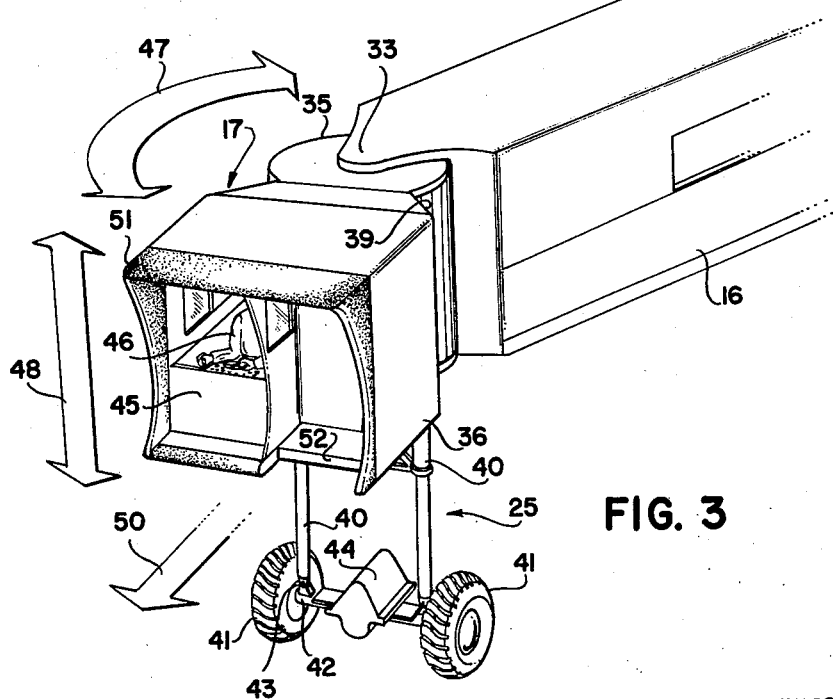
FIGURE 3 is a perspective view of the aircraft entry vestibule shown in FIGURE 2.
Figures 4, 5:
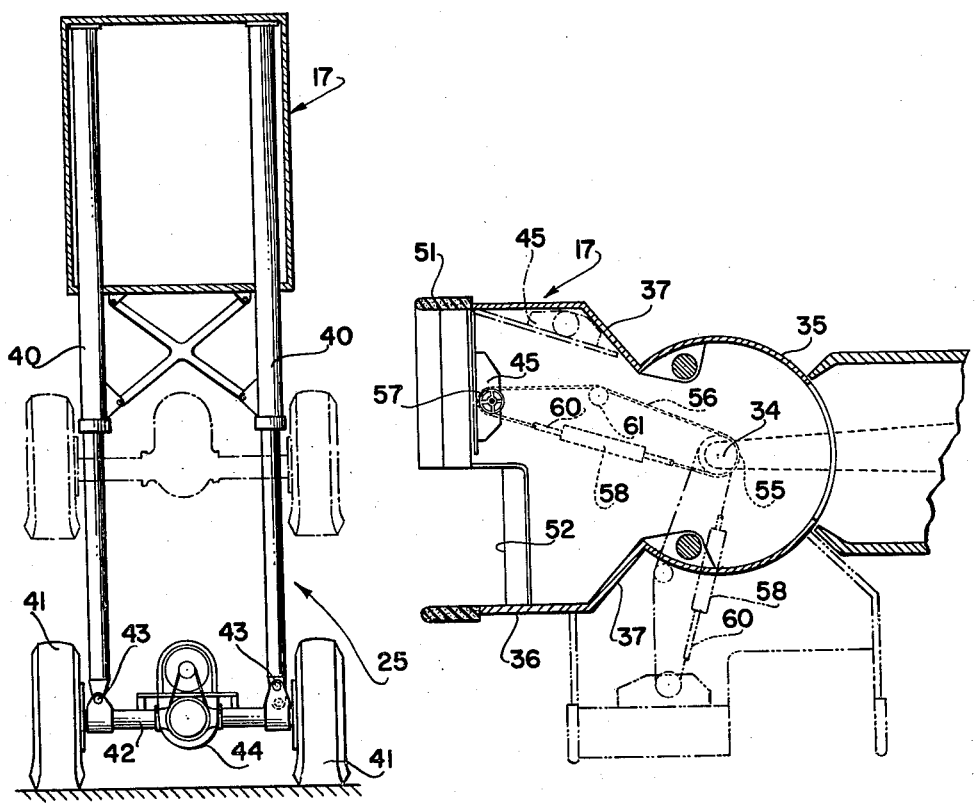
FIGURE 4 is a vertical sectional view of the outboard mobile support structure for the ramp shown in FIGURE 2 taken in the direction of arrows 4—4.
FIGURE 5 is a horizontal sectional view of the aircraft entry vestibule carried on the outboard mobile support structure shown in FIGURE 2 taken in the direction of arrows 5—5.

Referring to FIGURES 3 and 4, it is noted that the pistons are pivotally mounted on opposing ends of the common axle at pivot points 43 so that the angle of the wheels may be selected with respect to uneven terrain in a fashion that maintains the floor line of the passageway substantially level regardless of uneven ground level terrain. The wheels shown in broken lines in FIGURE 4 represent the withdrawal of the pistons into the respective cylinders in order to lower the end of the passageway to accommodate varying heights of aircraft doorways so that proper vertical mating between the aircraft vestibule and the doorway can be accommodated. A drive mechanism 44 is carried on the axle between wheels 41 and provides the source of power for activating the wheels for driving the vestibule 17 including the passageway.

FIGURE 3 shows an operator's console 45 and an operator 46 for manually operating the controls for driving the power mechanism and for steering the mobile support structure 25 as denoted by the arrows in the figure. The aircraft vestibule on its mobile support structure can be rotated in accordance with arrow 47, vertically raised and lowered in accordance with arrow 48, and moved in a fore and aft direction in accordance with arrow 50. When moved in accordance with arrow 50, the various sections of the passageway are extended or retracted in accordance with their telescoping arrangement and when the vestibule is moved upwards or downwards in accordance with arrow 48, the passageway is pivoted about hinge connection 32.

It is noted that the extreme free end and entrance to the vestibule 17 is provided with a peripheral cushion or bumper 51 suitably configured to mate with the outside contour of conventional aircraft fuselages. Also, a cutout portion 52 is provided in the bumper which accommodates an aircraft door when the door is open. Once the passage is in proper position, the console 45 is removed including the steering wheel so that a passenger walkway area is provided unobstructed by controls or the operator's equipment.

The horizontal sectional view of the airplane's vestibule as shown in FIGURE 5 illustrates the steering mechanism employed to position the airplane vestibule 17 about the free end of outboard sections 16 of the passageway. The steering mechanism comprises in general, a stationary sprocket 55 carried on the bottom of the floor of the vestibule portion 35 at the center 34 about which is placed a chain 56 which is also trained about a steer follow-up mechanism 57 located in the same plane as sprocket 55 and also supported on the bottom of the floor of the vestibule. A steer cylinder 58 is provided having a piston 60 which is forcibly moved through the steer cylinder to draw the chain about sprockets 55 and follow-up mechanism 57. As the chain is so drawn, the airplane vestibule is positioned relative to the sprocket 55 and hence the free end of outboard section 16. By such a steering mechanism, the vestibule may take any position between the two extreme positions shown in broken lines in FIGURE 5 which represent the extreme right and left hand vestibule positions 90° relative to the center line of the passageway. Such an arrangement provides a range of 130° to 150° normal cone of vision for an operator seated in the operator's position shown in FIGURE 3. An adjustable chain tension sprocket 61 insures that a constant tension and take-up force is supplied for eliminating any slack in the chain 56.

With reference to FIGURE 6, turntable 27 is shown which pivotally supports the passageway for vertical movement and also for horizontal rotation of the passageway. Side curtains are shown attached at one end to the sides of the passageway while directed to train past a roller 70 into a storage compartment 71 enclosing a curtain drum 72 on which the flexible curtain is rolled and stored. The curtain drum may be driven by any suitable means or may be spring loaded to provide sufficient tension for drawing the curtain 30 onto the drum as the passageway is rotated on the turntable and of sufficient tension to hold the curtain taut regardless of the direction in which the passageway is pivoted.

From the foregoing detailed description, it will be seen that we have provided a practical, effective loading and unloading bridge structure suitable for use with aircraft, trucks and other vehicles and operable to materially expedite the loading and unloading of aircraft passengers, freight, commissary materials and the like, at air terminals, etc. The passageway is readily pivoted outwardly from adjacent the terminal face of an air terminal in a complex curve pattern as shown in FIGURE 1 into close proximity to the fuselage of an aircraft 9. As the power mechanism carried by the support structure of the aircraft vestibule moves the outboard end of the passageway from the terminal face, the telescoping sections 15 and 16 extend from section 14. The motive power on the drive-out vestibule is used to rotate the passageway and to pull the outer two sections into full extension. The latter two sections telescope relative to the inboard section 14 by a system of hidden rollers and flush-to-the-floor track surfaces, which are designed to take the resulting concentrated loads. Interior rolling surfaces do not obstruct the walking area. During this operation, the telescoping sections trail linearly behind and the vestibule is raised or lowered to the approximate height of the particular airplane. Final vertical, lateral, and axial adjustments are made by the operator when he is in close proximity to the airplane door.

The passageway ramp structure is very flexible in its operation and is, therefore, capable of use in the loading and unloading of aircraft of different types and models, taxied to appropriate positions to adjacent the dock 8. The various elements of the bridge structure are conveniently controlled by the one operator stationed at the control panel 45.

Having described only a typical form of the invention we do not wish to be limited to the specific details herein set forth, but wish to reserve to ourselves any variations or modifications to those skilled in the art and fall within the scope of the following claims.

We claim:

1. A passenger loading and unloading arrangement adapted to be connected to a terminal building wherein the building entrance is at least one floor level above ground, an enclosed passageway comprising, a telescoping three sectioned ramp arrangement extensible and retractable to and from the building, means pivotally supporting one end of the ramp arrangement adjacent the building for horizontal and vertical rotary movement, a pair of vertically spaced members extending from the ramp arrangement at its free end, a vestibule rotatably mounted on a vertical axis between the pair of members for horizontal movement relative to the ramp arrangement, a powered wheel structure for powering the ramp arrangement, a pair of piston and cylinder assemblages fixed to the vestibule and pivotally connected to the wheel structure for supporting the ramp arrangement and raising and lowering the vestibule relative to the ground, the piston and cylinder assemblages selectively operable to adjust the wheel structure to follow irregular ground terrain while maintaining the ramp arrangement level, and steering mechanism carried on the vestibule and operatively connected to the ramp arrangement for rotating the vestibule about the center line of the ramp arrangement to extend and retract the telescoping sections.

2. A passenger loading and unloading arrangement adapted to be connected to a terminal building wherein the building entrance is at least one floor level above ground, an enclosed passageway comprising, a telescoping three sectioned ramp arrangement extensible and retractable to and from the building, means pivotally supporting one end of the ramp arrangement adjacent the building for horizontal and vertical rotary movement, a pair of vertically spaced members extending from the ramp arrangement at its free end, a vestibule mounted on a vertical axis between the pair of members, means for pivotally retaining the vestibule between the pair of members for horizontal movement relative to the ramp arrangement, a powered wheel structure having an axle for powering the ramp arrangement, a pair of piston and cylinder assemblages fixed to the vestibule and pivotally connected to the opposite ends of the wheel structure axle for supporting the ramp arrangement and for raising and lowering the vestibule relative to the ground, the piston and cylinder assemblages selectively operable to differentially adjust the wheel structure vertically to follow irregular ground terrain while maintaining the ramp arrangement level, and steering mechanism carried on the vestibule and operatively connected to the ramp arrangement for rotating the vestibule about the center line of the ramp arrangement to extend and retract the telescoping sections in cooperation with the powered wheel structure.

References Cited in the file of this patent

UNITED STATES PATENTS 2,851,293    Read ------------------ Jan. 1, 1952
2,875,457    Read ------------------ Mar. 3, 1959

OTHER REFERENCES

Engineering News-Record, page 42, July 3, 1958.